United States Patent Office 3,567,707
Patented Mar. 2, 1971

3,567,707
DISAZO COUPLING PROCEDURE
Arthur S. Neave, Jr., Indian Hill, and Arthur J. Schroeder, Wyoming, Ohio, assignors to Sterling Drug, Inc., New York, N.Y.
No Drawing. Continuation-in-part of application Ser. No. 492,872, Oct. 4, 1965. This application Apr. 4, 1968, Ser. No. 718,936
Int. Cl. C09b 31/14
U.S. Cl. 260—161
2 Claims

ABSTRACT OF THE DISCLOSURE

The process of coupling tetrazotized 3,3′-dichlorobenzidine with 3-methyl-1-p-tolyl-2-pyrazolin-5-one or 3-methyl-1-phenyl-2-pyrazolin-5-one at a pH of 0.5 to 1.0 results in the formation of known pigments having improved dry cleaning fastness and lightfastness.

---

This application is a continuation-in-part of our prior copending United States patent application Ser. No. 492,-872, filed Oct. 4, 1965, now abandoned.

This invention relates to azo dyestuffs and, in particular, pertains to a novel and improved method for preparing azo pigments of the pyrazolone class.

The disazo pigments produced by coupling tetrazotized 3,3′-dichlorobenzidine with 3-methyl-1-phenyl-2-pyrazolin-5-one and 3-methyl-1-p-tolyl-2-pyrazolin-5-ones by the conventional coupling procedure are known. The dyestuffs are characterized by a brilliant orange color, water-insolubility, and particularly in the case of the pigment obtained from 3-methyl-1-p-tolyl-2-pyrazolin-5-one, high fastness to light and dry cleaning solvents.

According to the procedure for preparing said azo pigments as described in the prior art, a solution containing one mole of tetrazotized 3,3′-dichlorobenzidine is added to a solution of two moles of the pyrazolone coupler, for example, 3-methyl-1-p-tolyl-2-pyrazolin-5-one, in aqueous alkaline solution. This procedure reflects the conventional method for preparing azo dyes of the pyrazolone class, as employed in the art for many decades.

However, the conventional procedure has certain inherent undesirable features. For example, as the acidic tetrazotized benzidine solution is added to the alkaline pyrazolone solution, the coupling mixture becomes more acidic. Inasmuch as the pyrazolone is in solution by virtue of being in the form of its alkali metal salt (usually the sodium salt), the rising acidity of the mixture often precipitates some pyrazolone compound in its insoluble acid form, which results in, at best, a slower coupling reaction, and often the formation of gummy residue.

We have found that the above disadvantages of the conventional process can be overcome, and a product with improved characteristics can be obtained by employing the novel features of this invention.

It might be assumed from the prior art that azo coupling of pyrazolones would be difficult, very slow, or even impossible under highly acid condition. For example, the prior art teaches that the reactive form of pyrazolones is the enolate ion, because the coupling rate increases rapidly with an increase in pH. This would lead one to expect that the coupling of a pyrazolone in acid solution would be extremely slow, for under acid conditions, the keto form should predominate. In the light of this teaching, the invention described herein is particularly surprising.

One aspect of our invention resides in the concept of a process for preparing a disazo pigment of the formula

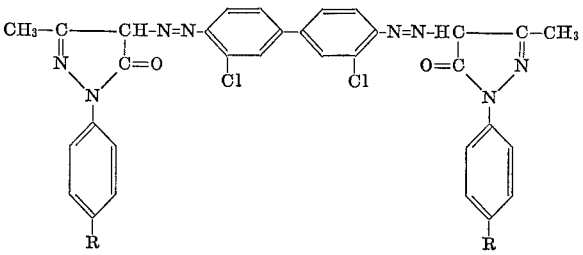

wherein R is H or methyl, which comprises coupling 3,3′-dichlorobenzidine with a pyrazolone compound selected from the class consisting of 3-methyl-1-phenyl-2-pyrazolin-5-one and 3-methyl-1-p-tolyl-2-pyrazolin-5-one in acidic aqueous medium at a pH of 0.5–1.0. The process is conveniently carried out by dissolving the pyrazolone compound, for example 3-methyl-1-p-tolyl-2-pyrazolin-5-one in an acidic medium, preferably a mineral acid such as hydrochloric acid, sulfuric acid, phosphoric acid, and the like. The acidic pyrazolone solution and the acidic tetrazonium salt solution are then mixed, and the coupling is allowed to take place in the strongly acid solution. Since no severe pH change occurs during the mixing of the two reactants, the pyrazolone does not tend to come out of solution. Moreover, contrary to expectations in view of the teaching of the art, the coupling reaction in highly acidic solution has been found to occur much more rapidly than under the more alkaline conditions of the conventional procedure.

Another aspect of our invention resides in the surprising discovery that the products obtained by the operation of our new process possess novel and improved properties over the products obtained in accordance with the conventional process. Thus, the azo pigments produced by coupling in acid solution have been found to have enhanced dry cleaning fastness and lightfastness in comparison with the conventional product. Moreover, the pigments obtained by our new process are, in general, a redder shade of orange than are the same products made by the conventional method. In addition, because of the avoidance of a basic to acidic pH change, with the concomitant problems of decreasing solubility of the pyrazolone reactant, the resulting azo product is of higher pigment quality than that obtained previously.

In practice, we have found that the coupling reaction is best performed at a pH of about 0.5 to 1.0, although moderate variations on either side of the range do not seriously affect the operability of the invention. We prefer to warm the pyrazolone solution in acid to effect solution, and to add the warm solution to the ice-cold tetrazonium salt solution; i.e., we generally employ "reverse" addition for the coupling reaction.

We will now set forth the best mode contemplated by us of carrying out our invention. The examples which follow are given for the purpose of illustration only, and the invention is not necessarily limited thereto:

EXAMPLE 1

To a hot solution (80° C.) containing 200 ml. of concentrated hydrochloric acid in 400 ml. of water was added 204 g. (1.09 mole) of 3-methyl-1-p-tolyl-2-pyrazolin-5-one. The resulting solution was diluted with 1500 ml. of water. Another solution containing tetrazotized 3,3′-dichlorobenzidine was prepared in the usual manner from 126.5 g. (0.5 mole) of 3,3'-dichlorobenzidine 338 g. of 18° Bé. hydrochloric acid and 71 g. of sodium nitrite in a total of 1000 ml. of $H_2O$. This solution was diluted to 12–14 l. and was filtered. The pyrazolone solution at a temperature of about 30–40° C. was added to the tetrazotized dichlorobenzidine solution at 10–15° C., giving a mixture at about 20° C. and having a pH of 0.7. Coupling was complete under these conditions in about one-half hour. The azo mixture was heated to 95° C., maintained at that temperature for one-half hour, and flooded with water. The pH of the mixture was then adjusted to 6.5. The pigment was collected on a press and washed with water. The resulting azo pigment, having the formula

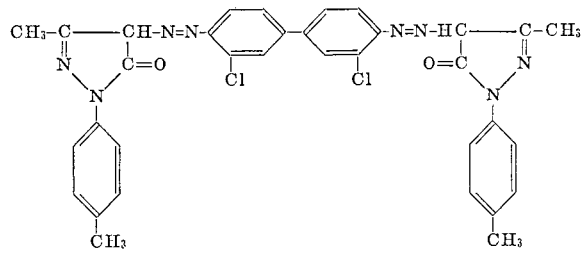

had a bright red-orange color. It was insoluble in water, dilute aqueous sodium hydroxide solution, and perchloroethylene, and was slightly soluble in boiling N,N-dimethylformamide.

The pigment of this invention obtained as described above was evaluated in the following manner as a pigment for use in textile printing.

An aqueous dispersion of the new pigment was prepared by dispersing an undried press cake of the pigment in water containing the sodium salt of a formaldehyde naphthalene-sulfonic acid condensation product in the amount of 3–7 percent of the calculated weight of dry pigment in the press cake. To produce a concentrated color base, 100 parts of the water dispersion thus prepared and containing 20–25 percent by weight of the new pigment was emulsified with 100 parts of an emulsifiable vehicle composed of: 4 parts of a 50 percent solution of unmodified butylated melamine-formaldehyde resin (Resimine 875, Monsanto) in a mixture of equal parts of butanol and xylene: 13 parts of dipentene; 0.6 part of ethyl cellulose (N–22, Hercules); and 2.4 parts of isooctyl alcohol. One part of the water-in-oil emulsion thus obtained was mixed, using a high speed mixer, with 10 parts of a textile printing clear (water-in-oil type) to produce a 1 to 10 cut printing paste. By mixing one part of the 1 to 10 cut printing paste with 10 parts of the printing clear, a 1 to 100 cut printing paste was produced. The printing pastes were then printed on cloth, using a standard laboratory textile printing machine. The printed cloths were then examined and tested using standard procedures, with respect to the following: shade, resistance to fading, and resistance to loss of color value on dry cleaning with perchloroethylene (using AATCC color-fastness to dry cleaning tentative test method 85–1960).

Preparations of the aforementioned pigment were made in accordance with two methods of the prior art by dissolving the 3 - methyl - 1 - p - tolyl-2-pyrazolin-5-one coupler in alkaline solution. In one preparation, sodium acetate was added to the coupler solution in order to form an acetate-acetic acid buffer upon addition of the acidic tetrazonium salt solution. In the second prior art preparation, oleylamine acetate and calcium carbonate were added to the alkaline coupler solution. In each case the coupling was carried out in the normal fashion, the pigment was collected and formulated in a textile ink as above. In comparison with the said pigments prepared by the prior art processes, the pigment prepared in accordance with Example 1 above was redder, had a higher color value, and was more resistant to ultraviolet light and dry cleaning solvents.

EXAMPLE 2

Following the procedure of Example 1, tetrazotized 3,3'-dichlorobenzidine was coupled to 3-methyl-1-phenyl-2-pyrazolin-5-one dissolved in concentrated hydrochloric acid. The resulting pigment, having the formula

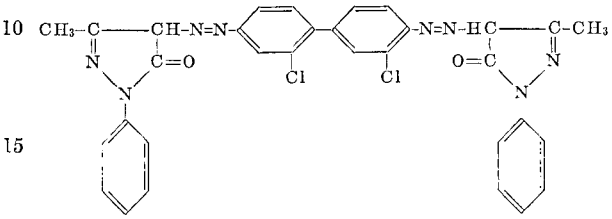

had a bright orange color. The pigment was formulated into a textile ink as described in Example 1.

The same pigment, prepared in accordance with the alkaline coupler solution method of the prior art, employing oleylamine acetate and calcium carbonate, was formulated into a textile ink in the same manner. A comparison of this pigment with that prepared in accordance with Example 2 showed that the latter compound was more resistant to ultraviolet light and dry cleaning solvents and had a higher color value.

We claim:
1. In the process for preparing a disazo pigment of the formula

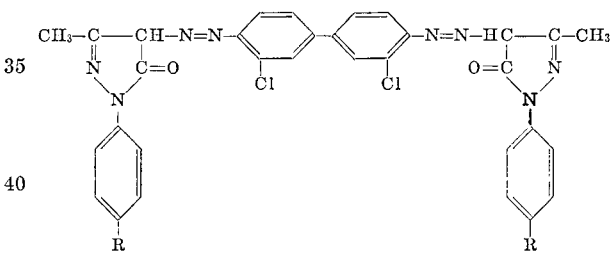

wherein R is H or methyl, by coupling tetrazotized 3,3'-dichlorobenzidine with 3-methyl-1-phenyl-2-pyrazolin-5-one or 3-methyl-1-p-tolyl-2-pyrazolin-5-one, the improvement which consists of dissolving said 3-methyl-1-phenyl-2-pyrazolin-5-one or 3-methyl-1-p-tolyl-2-pyrazolin-5-one reactant in an acidic medium and performing the coupling reaction at a pH of 0.5–1.0.

2. A process in accordance with claim 1 for preparing the disazo pigment of the formula

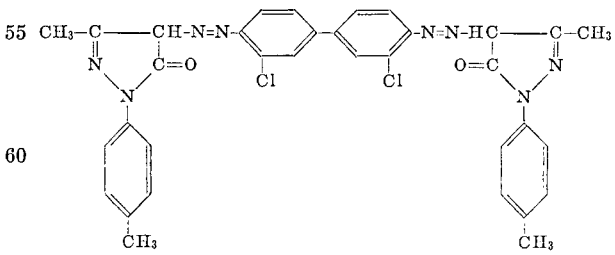

References Cited
UNITED STATES PATENTS 3,120,508    2/1964    Braun et al. _____ 260—161

CHARLES B. PARKER, Primary Examiner

D. M. PAPUGA, Assistant Examiner

U.S. Cl. X.R.

117—138.8; 106—22, 288; 260—39